United States Patent [19]
Morin

[11] Patent Number: 5,567,097
[45] Date of Patent: Oct. 22, 1996

[54] DEVICE FOR FASTENING AN ASSEMBLY ON THE BODYWORK OF A MOTOR VEHICLE, AND A SCREEN WIPER MODULE INCLUDING SUCH A DEVICE

[75] Inventor: Pascal Morin, Chatellerault, France

[73] Assignee: Valeo Systemes D'Essuyage, La Verriere, France

[21] Appl. No.: 447,696

[22] Filed: May 23, 1995

[30]  Foreign Application Priority Data

May 26, 1994 [FR] France ................................ 94 06517

[51] Int. Cl.$^6$ ............................. F16B 13/04; F16B 13/06
[52] U.S. Cl. ................................ 411/34; 411/51; 411/907
[58] Field of Search ........................... 411/34, 36, 37, 411/38, 50, 51, 52, 907, 55; 296/96.15, 192

[56] References Cited

U.S. PATENT DOCUMENTS

| | | | |
|---|---|---|---|
| 2,365,372 | 12/1944 | Allen | 411/34 X |
| 3,014,563 | 12/1961 | Bratton | 411/34 X |
| 3,343,442 | 9/1967 | Knowlton et al. | 411/34 |
| 5,203,602 | 4/1993 | Eustache | 296/192 X |

FOREIGN PATENT DOCUMENTS

| | | | |
|---|---|---|---|
| 1900911 | 9/1969 | Germany | 411/51 |
| 700379 | 12/1953 | United Kingdom | 411/34 |

*Primary Examiner*—Neill R. Wilson
*Attorney, Agent, or Firm*—Morgan & Finnegan L.L.P.

[57]  ABSTRACT

A device for fastening to the body of a motor vehicle an assembly comprising a support plate, is of the type comprising a bolt-and-nut assembly. The threaded shank of the bolt passes through a hole in the support plate, a hole formed in a damping ring which is interposed between the support plate and a first face of a bodywork element of the vehicle, and a hole in the bodywork element itself. The bolt is screwed into a nut which is located beyond the opposite face of the bodywork element, and which is received in a nut retaining cage. The damping ring and the cage are made integrally with each other as a single assembly member of elastomeric material or rubber; the portion of this assembly member that defines the cage deforms in expansion while the nut is being tightened on to the bolt.

1 Claim, 1 Drawing Sheet

& # 1

DEVICE FOR FASTENING AN ASSEMBLY ON THE BODYWORK OF A MOTOR VEHICLE, AND A SCREEN WIPER MODULE INCLUDING SUCH A DEVICE

FIELD OF THE INVENTION

The present invention relates to a fastening device for fastening a plate on to an element of the bodywork of a motor vehicle, and more particularly for fastening an assembly which includes a plate on to a body panel of a motor vehicle.

The invention is, in particular but without limitation, applicable for the fitting and fastening of a screen wiper module on to the body of the vehicle. Such a screen wiper module comprises a support plate which carries the various components which are provided for the purpose of driving at least one screen wiper in alternating motion over a glass surface of the vehicle, such as its windshield.

BACKGROUND OF THE INVENTION

In one type of known arrangement, the support plate has a set of fastening holes which are arranged so that each of these holes receives, passing through it, the threaded shank of a bolt or screw which is part of an assembly of the screw and nut type.

It is again known to arrange that the threaded shank or body passes through a hole in the plate, and also through a hole which is formed for example in a damping ring interposed between the plate and one surface of an element of the bodywork of the vehicle, and a hole in this bodywork element, so that it is threaded into a nut. This nut is arranged on the other face of the bodywork element and is received in a cage for retaining the nut in place.

In the arrangement most commonly in use at the present time, the damping ring is made in the form of an elastic support which is mounted in the hole in the support plate.

The known designs of nut cage are designs in which the cage is a press-formed and bent sheet metal element, within which the nut is mounted, and which is then elastically fitted in to the hole which is formed in the bodywork element. This arrangement is completed by means which prevent the cage from rotating with respect to the bodywork element.

These examples of designs are particularly costly and difficult to apply, especially within the context of automatic assembly and fitting of sub-assemblies on to the body of a vehicle.

DISCUSSION OF THE INVENTION

An object of the present invention is to propose a novel design for a fastening device of the general type described above, but which enables these drawbacks to be overcome.

According to the invention in a first aspect, a fastening device for fastening on the body of a motor vehicle as assembly comprising a plate, the fastening device being of the type comprising an assembly of the screw and nut type, the threaded body of which extends through a hole in the plate, a hole formed in a damping ring interposed between the plate and a first surface of a bodywork element of the vehicle, and a hole in the bodywork element itself, so as to be screwed into a nut which is deployed beyond the other surface of the bodywork element, being received in a nut-retaining cage, is characterized in that the damping ring and the cage are formed integrally with each other to constitute a one-piece assembly member of resilient material (e.g. elastomeric material or rubber), the portion of the assembly member that defines the cage being deformable in expansion during the operations of tightening the screw and nut assembly.

The threaded body is preferably part of a bolt.

The assembly member preferably has the form substantially of a body of revolution about the screwing axis.

According to a preferred feature of the invention, the portion of the assembly member defining the cage has a stepped bore comprising a first bore portion in which the threaded body is rotatable, together with a second portion, larger in width than the first portion, for receiving the nut.

According to another preferred feature of the invention, the free end of the portion of the assembly member that defines the cage includes retaining means for axial retention of the nut within the second bore portion. This bore preferably includes a third bore portion which is narrower than the second bore portion. In one embodiment of the invention, the portion of the one-piece assembly member that defines the cage is squeezed radially inwardly.

The junction zone between the first and second bore portions is preferably made conical. The assembly member may, in some embodiments of the invention, be molded directly on to the nut.

Preferably, the assembly member is force-fitted into the hole formed in the bodywork element of the vehicle prior to the tightening operation.

According to the invention in a second aspect, there is provided a screen wiper module for a glazed surface of a motor vehicle, comprising a support plate carrying components for driving at least one screen wiper, characterized in that the support member is fixed on to an element of the body of the-vehicle by means of a fastening device made in accordance with the invention in its said first aspect.

Further features and advantages of the invention will appear more clearly from a reading of the detailed description that follows, which is given by way of example only and with reference to the accompanying drawings.

DESCRIPTION OF PREFERRED EMBODIMENTS OF THE INVENTION

Figure 1:
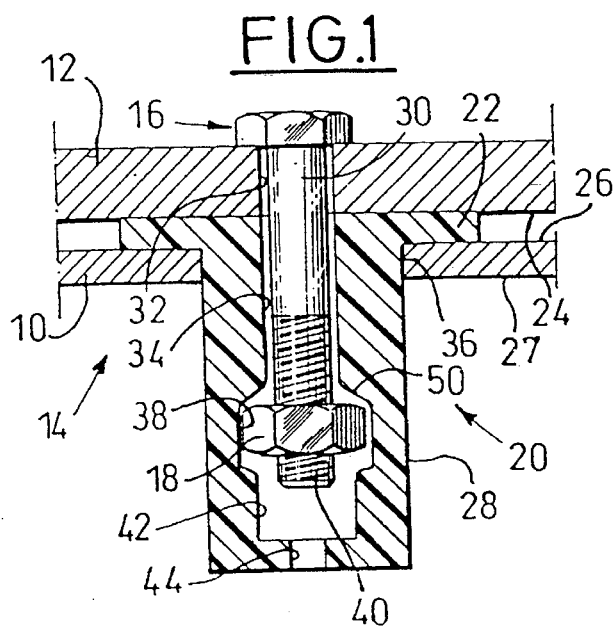
FIG. 1 is a diagrammatic view in axial cross section showing a first embodiment of a fastening device in accordance with the invention, and which is shown in FIG. 1 prior to being tightened.

Referring firstly to FIG. 1, this shows part of a panel 10 which is a structural element of the body of a motor vehicle. A plate 12, which may for example be a support plate forming part of a screen wiper module, is secured to the body panel 10.

The plate 12 is secured on the panel 10 by means of a fastening device 14, which consists essentially of a bolt 16 in combination with a nut 18, together with an assembly member 20 of a suitable elastomeric material. This one-piece component 20, which is resiliently deformable, includes an outer ring portion 22 which is interposed between the inner face 24 of the plate 12 and the first, or outer, surface 26 of the panel 10. The component 20 also includes a body portion 28 which has a generally cylindrical external form, and which functions as a retaining cage for the nut 18. The body portion 28 serves as an expandable plug, and extends axially beyond the second, or inner, surface 27 of the body panel 10.

The threaded shank 30 of the bolt 16 passes in succession through a hole 32 formed in the support plate 12 and a first bore portion 34 formed in the outer part of the inner body portion 28 of the assembly member 20. The latter extends through a further hole 36, formed in the body panel 10. In order to prevent any relative rotation of the component 20 with respect to the body panel 10, during the initial tightening phase of the bolt 16 and nut 18, the body portion 28 is to a slight extent force-fitted in the hole 36.

The first bore portion 34 leads into a second bore portion 38 of larger diameter. The nut 18 which receives the threaded free end 40 of the bolt 16 is inserted in the second bore portion 38. In order to prevent the nut 18 from falling vertically out of the member 20 prior to introduction of the bolt 16 into the latter, the stepped bore formed in the body portion 28 of the member 20 terminates at its lower end in a third bore portion 42, having a diameter which is smaller than that of the second bore portion 38.

The nut 18 may be introduced initially by force, through the pierced inner end 44 of the member 20, until it is in the position shown in FIG. 1 within the second bore portion 38. Alternatively, in another design, the one-piece assembly member 20 may be molded over the nut 18.

Figure 2:
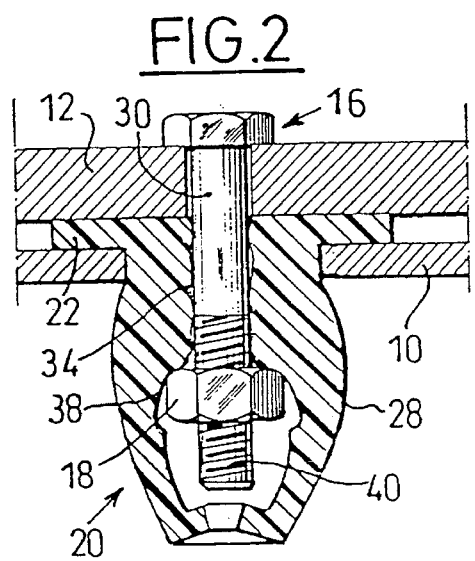
FIG. 2 is a view similar to that in FIG. 1, showing the same fastening device after being tightened.

Fitting and fastening of the support plate 12 is carried out in the following way. The operator, or the machine carrying out automatic assembly, begins by putting the one-piece assembly member 20 into its position shown in FIG. 1. The bolt 16 is then tightened, during which its threaded free end 40 starts by threading itself into the nut 18. As rotation of the bolt is continued, and since the nut 18 is immobilized with respect to the remainder of the assembly, the nut 18 progresses along the shank 30 of the bolt, and this causes the outer part (i.e. the upper part in the drawings) of the body portion 28 to expand radially as is shown in FIG. 2.

Once the tightening operations have been completed, the support plate 12 is firmly fixed on the body panel 10 by means of the one-piece assembly member 20, which is now in the form of an expanded retaining plug; and the ring-shaped upper or outer portion 22 of the latter is interposed between the support plate 12 and the body panel 10, so that it acts as a damper against vibrations.

Figure 3:
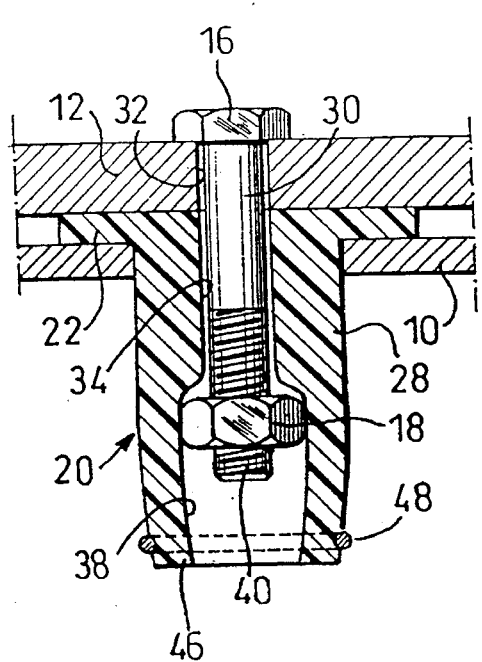
FIG. 3 is a view similar to that of FIG. 1, but shows a second embodiment of a fastening device in accordance with the invention.

Reference is now made to FIG. 3 showing a first modified embodiment of the invention. In this embodiment, the terminal inner part 46 of the body portion 28 of the assembly member 20 is squeezed radially inwardly by means of an elastic gripping ring 48, so as to prevent axial escape of the nut 18 out of the second portion 38 of the stepped bore formed in the body portion 28. As can be seen in FIGS. 1 to 3, the junction zone 50 between the first portion 34 and the second portion 38 of the stepped bore has a conical profile, so as to facilitate the expansion of the plug during the tightening operations.

Figure 4:
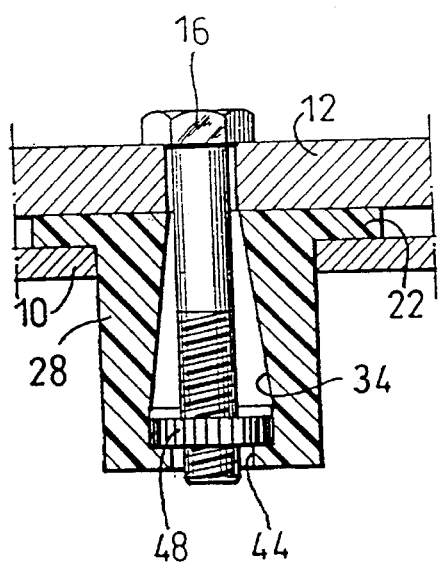
FIG. 4 is a view similar to that in FIG. 1, showing a third embodiment of a fastening device in accordance with the invention.

Referring now to FIG. 4, in this second example of a modified embodiment of the invention, the whole length of the first bore portion 34 has a conical profile, while the second bore portion 38 is substantially cylindrical, being of a depth which is reduced to that of the nut 48. In this example, the nut 48 is in the form of a centrally threaded ring, the cylindrical peripheral outer surface of which is formed with grooves or knurls which prevent it from rotating within the body portion 28 of the member 20.

The hole 44 which is formed at the inner free end 46 of the member 20 serves as the third bore portion, like the bore portion 42 of the stepped bore formed in the body portion 28, so as to prevent loss of the nut 48 prior to the fitting and tightening operations.

The invention is not limited to the embodiments described above and shown in the drawings. The concept of a cage formed integrally with the damping ring 22 embraces all possible means for performing the same function, whether the nut is retained directly within the body portion 28, or whether it is for example held at the lower end of the latter.

The nut 18 may also be integrated with the single assembly member 20, for which purpose the internal bore of the member 20 is then threaded so as to serve as an expandable gripping nut.

What is claimed is:

1. A fastening device for fastening a plate having a first hole formed through the plate, on to a structural element having a second hole formed through the structural element, the latter defining a first surface and a second surface on the opposite side thereof from its first surface, the fastening device comprising a damping ring to be interposed between the said plate and said first surface, the damping ring having a third hole formed through it; a fastener assembly comprising a threaded body and a nut, the threaded body being adapted to pass through said first hole, and a hollow cage for retaining the nut therein beyond the said second surface of the panel prior to being engaged by the threaded body, wherein the fastening device includes a one-piece assembly member comprising the said damping ring and cage formed integrally with each other in a resilient material, the cage being adapted to extend through the said second hole whereby to be deformed in expansion as the nut is tightened on to the threaded body and wherein the portion of the assembly member that defines the said cage has a stepped bore comprising a first bore portion, in which the said threaded body is rotatable, and a second bore portion of larger size than the first bore portion, the nut being received in the said second bore portion, the assembly member defining substantially a body of revolution about a screwing axis and further defining a conical junction zone between the said first and second bore portions.

* * * * *